(No Model.)  2 Sheets—Sheet 1.

D. R. HOWARD.
WHEEL GUARD FOR CARS.

No. 515,289. Patented Feb. 20, 1894.

WITNESSES
Dan'l Fisher
George Hemsley

INVENTOR
David R. Howard,
by H. T. Howard
atty.

(No Model.)  2 Sheets—Sheet 2.
D. R. HOWARD.
WHEEL GUARD FOR CARS.
No. 515,289.  Patented Feb. 20, 1894.
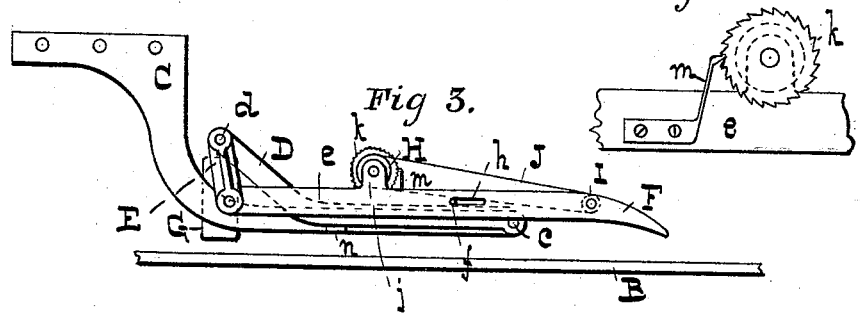
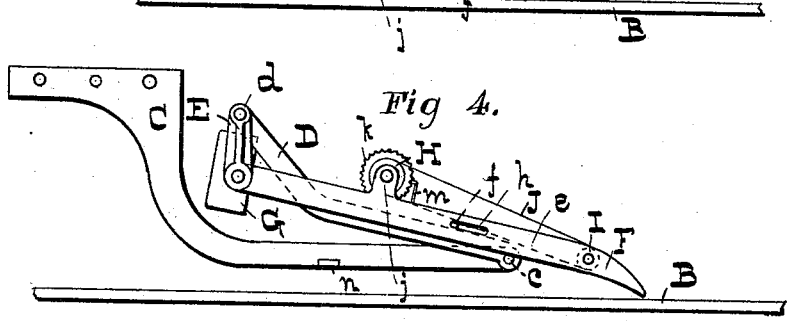
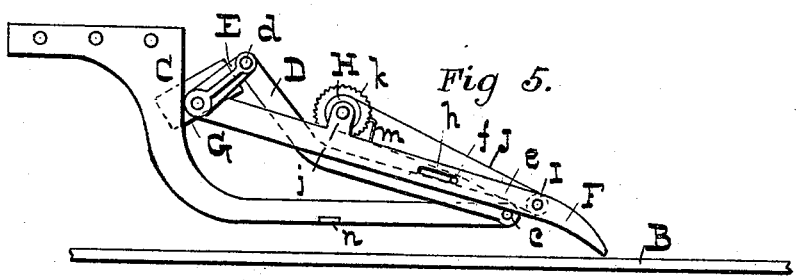
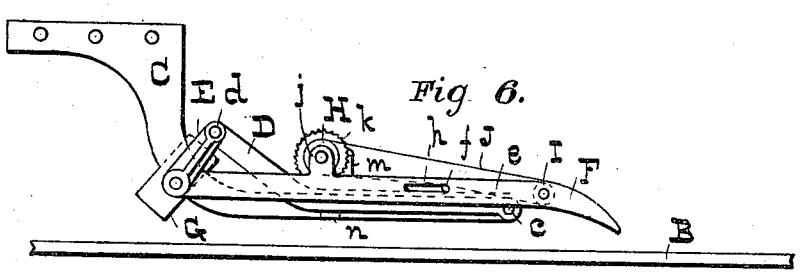
WITNESSES
Dan'l Fisher
George Hemsley
INVENTOR
David R. Howard
by [attorney signature]
Atty.

UNITED STATES PATENT OFFICE.

DAVID R. HOWARD, OF BALTIMORE, MARYLAND.

WHEEL-GUARD FOR CARS.

SPECIFICATION forming part of Letters Patent No. 515,289, dated February 20, 1894.

Application filed June 16, 1893. Serial No. 477,793. (No model.)

*To all whom it may concern:*

Be it known that I, DAVID R. HOWARD, of the city of Baltimore and State of Maryland, have invented certain Improvements in Wheel-Guards for Cars, of which the following is a specification.

It consists in adapting the portion of the wheel guard which first strikes the body, to tilt so as to bring its front edge nearly in contact with the road bed and thereby facilitate the raising of the body with which it is brought in contact, and which tilting is reversed in direction, as the body ascends the inclined plane of the guard, so that it will finally rest on a support in nearly a horizontal position, as hereinafter set forth and claimed.

In the further description of the said invention which follows, reference is made to the accompanying drawings forming a part hereof and in which—

Figure 1:
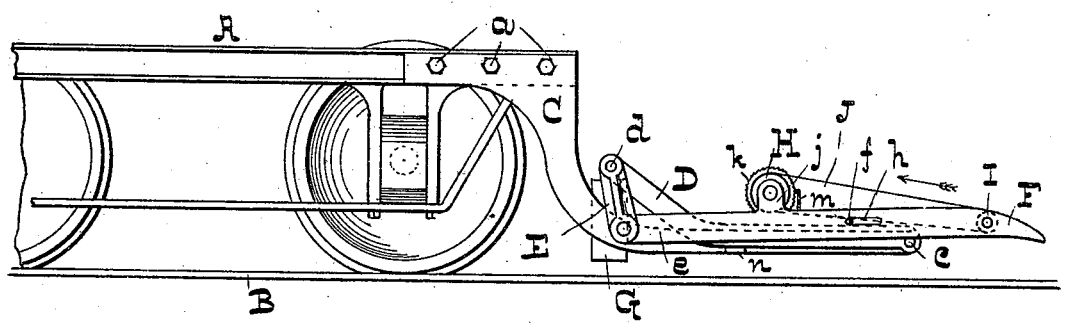
Figure 2:
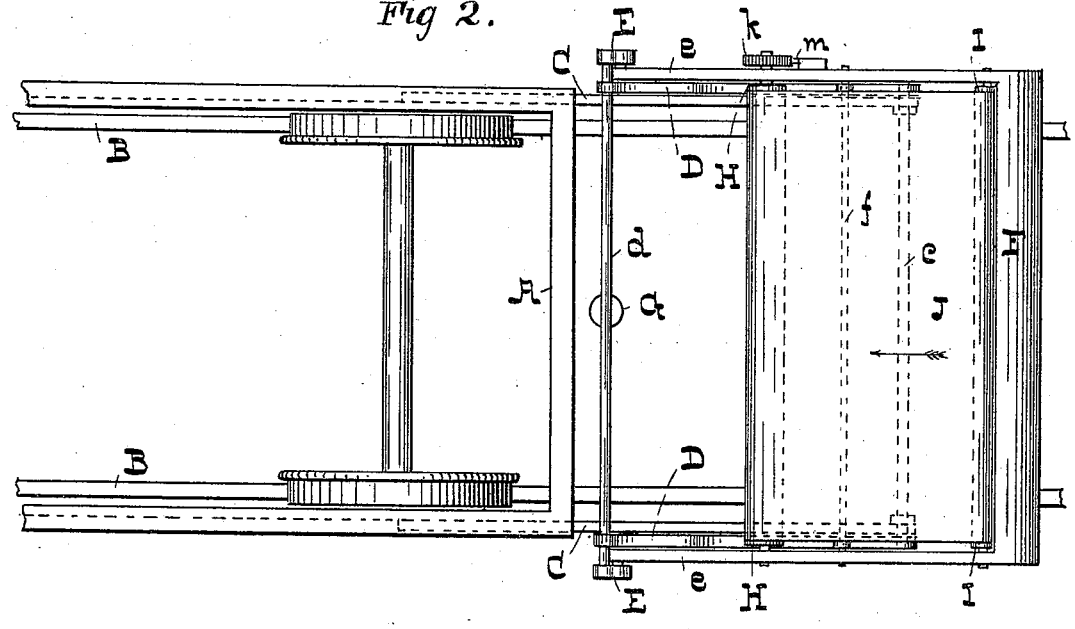

Figure 1 is an exterior side view of a part of a car truck provided with my improved wheel guard. Fig. 2 is a plan of Fig. 1. Figs. 3, 4, 5 and 6 are side views of the wheel guard alone, illustrating the different relative positions of the parts of the same during the operation of picking up a body. Fig. 7 is an enlarged detail of the apparatus.

Referring now to the drawings, A is a car truck, and B represents the track rails.

C C are brackets which in the present case are secured to the sides of the truck by means of the bolts $a$. The lower portions of these brackets extend in front of the car truck, and are preferably nearly parallel with the track rails. The said brackets are connected by a rod $c$ the ends of which pass through and project beyond the brackets, and serve as pivots on which the bars D vibrate. The inner ends of the bars D are turned upward and united by a rod $d$ which passes loosely through them.

E E are links to connect the rod $d$ with the ends of the side plates $e$, which side plates are pivoted to the bars D by means of a rod $f$ which extends entirely across the apparatus, see Fig. 2 in which it is shown in dotted lines. The holes $h$ in the side plates $e$ for the rod $f$ are elongated to admit of the telescoping of the apparatus, in other words, the longitudinal movement of the side plates independently of the rods D. The side plates are connected by the shoe piece F. In the drawings the shoe piece and the side plates are all formed in one piece.

G is a weight fastened to the lower side of the rod $d$ to effect the extension of the side plates $e$, as hereinafter more particularly described.

H and I are rollers, the latter and the smaller one, being situated between and having its gudgeons in, the side plates $e$ near the shoe piece F, and the former between lugs $j$ on the upper edge of the side plates $e$.

J is an endless apron formed of woven wire, duck, or any other suitable material, stretched tightly around the rollers H and I. The endless apron must have a movement only in one direction, viz., that indicated by the arrow in Figs. 1 and 2, and to this end, the gudgeon of the roller H is extended and provided with a ratchet wheel $k$ in engagement with a pawl $m$ secured to one of the side plates $e$.

The ratchet wheel and the pawl are shown in all the figures, but on an enlarged scale in Fig. 7 which is a view the reverse of the others.

The normal positions of the various parts of the invention are shown in Figs. 1, 2 and 3, and it will be seen that the side bars $e$ carrying the endless apron J are extended. This extension is effected by the weight G secured to the bar $d$ which in turn, is secured to the links E. The rod $d$ passes loosely through the bars D, consequently, in any deviation of the links E from the position which they are shown to occupy in Figs. 1 and 3, causes the weight to be thrown out of a plumb line. Now supposing that the shoe piece comes in contact with a body on the track or the roadbed, it is thrown down so that its edge comes nearly to the track rails. In the tilting of the side plates, the bars D are elevated, and the weight G carried somewhat out of a plumb line. The resistance which the body offers to removal, now causes the side plates $e$, together with the endless apron and its connections, to be forced back, and the weight G farther moved from the perpendicular, as shown in Fig. 5. This yielding of the shoe piece in the telescoping of the apparatus, reduces the impact, and the force of the moving car is gradually applied to the body. An inclined surface being opposed to the body, the latter is raised, and in coming into contact with the endless apron is easily carried back until its center of gravity passes the rod *c*, when the side plates and their connections fall, and are made to assume the relative positions indicated in Fig. 6.

It will be seen that in Figs. 3 and 6, the bars D rest on stops *n* on the brackets C.

It will be understood that the ratchet and pawl prevent the body sliding again to the road bed.

Upon the removal of the body from the endless apron, the weight G causes the parts to assume the positions shown in Fig. 3.

I claim as my invention—

In a wheel guard, the combination of brackets projecting from the car body, tilting side bars pivoted to the outer ends of the said brackets, side plates united to the rear ends of the side bars by means of links and adapted to move backward and forward relatively to the said side bars, and a shoe piece which unites the outer ends of the side plates, whereby, upon the guard striking a body, its forward end will be first depressed, the device then moved backward and the rear end elevated, and then as the body becomes seated on the guard, the said rear end falls to its original plane, substantially as specified.

DAVID R. HOWARD.

Witnesses:
DANL. FISHER,
GEO. E. TAYLOR.